Patented Oct. 18, 1932

1,883,367

UNITED STATES PATENT OFFICE

DANIEL M. GRAY, OF WHEELING, WEST VIRGINIA, ASSIGNOR TO HAZEL-ATLAS GLASS CO., OF WHEELING, WEST VIRGINIA, A CORPORATION OF WEST VIRGINIA

METHOD OF STABILIZING THE CONSISTENCY OF MAYONNAISE

No Drawing.  Application filed December 21, 1929. Serial No. 415,792.

One of the serious problems met with in the mayonnaise industry, is the rather sudden and substantial decrease in the consistency of the product when allowed to stand for a period of time. The present invention relates to a method of preparing mayonnaise, by which this falling in consistency is largely or entirely overcome; and to otherwise improve the product.

The inability of mayonnaise, as formerly prepared, to retain its original consistency, has been generally accepted by the trade as an inherent characteristic of the mayonnaise emulsion, and that it therefore presented a problem which could not be overcome. I have discovered, however, that the failure of mayonnaise to maintain its consistency is due largely to the effect of mustard in the emulsion; and I have further discovered that this peculiar effect of the mustard can be eliminated by properly treating the mustard prior to mixing it with the mayonnaise.

In accordance with the improved method, the dry white, or yellow or black mustard flour, or mustard bran or mids, is first mixed with a portion of the vinegar. In the claims, the term mustard or mustard flour is intended to include all varieties of mustard seed, bran, mids, etc. And, of course, the term "vinegar", in the claims, will include acetic acid.

The mixture of mustard and vinegar is then allowed to stand a short time in order to hydrolize the glucosides, and thus liberate the essential oils which give the mustard its characteristic flavor.

After standing a short time, the mixture of mustard and vinegar is processed at the proper temperature and for the proper period of time. I prefer to process the mixture at about 220° F. for about thirty minutes; but, of course, the invention is not limited to any particular temperature or any particular period of time, as these factors may vary within very wide limits.

After the mixture has been processed, it is allowed to cool, and is then used in the mayonnaise in the usual manner.

By thus mixing the mustard and vinegar, and then processing it before using it in the mayonnaise, the product maintains its original consistency or substantially its original consistency for a much greater period of time than has heretofore been possible. And it might be added, that the processing of the mustard does not impair the flavor of the mustard, but rather improves it.

While I have particularly described the present method in connection with vinegar, it is to be understood that the invention is of much broader scope, and would include any appropriate aqueous liquid.

The mayonnaise, produced by the method set forth above, may be shipped and stored for a much longer period than has heretofore been possible, without any serious loss of consistency; thereby widely increasing the field of distribution of mayonnaise manufacturers.

What I claim is:

1. The method of stabilizing the consistency of mayonnaise, which consists in mixing mustard flour with vinegar, and then processing the mixture with heat prior to its use as an ingredient in mayonnaise.

2. The method of stabilizing the consistency of mayonnaise, which consists in mixing mustard flour with vinegar, allowing the mixture to stand for a period, and then processing the mixture with heat prior to its use as an ingredient in mayonnaise.

3. The method of stabilizing the consistency of mayonnaise, which consists in mixing mustard with an aqueous liquid, and then processing the mixture with heat prior to its use as an ingredient in mayonnaise.

4. The method of stabilizing the consistency of mayonnaise, which consists in mixing mustard with vinegar, allowing the mixture to stand for a period, processing the mixture at approximately 220° F. for approximately thirty minutes, and allowing the mixture to cool prior to its use as an ingredient in mayonnaise.

DANIEL M. GRAY.